(12) United States Patent
Deak et al.

(10) Patent No.: US 9,805,224 B2
(45) Date of Patent: Oct. 31, 2017

(54) MAGNETIC ANTI-COUNTERFEIT LABEL AND IDENTIFICATION SYSTEM THEREOF

(71) Applicant: MultiDimension Technology Co., Ltd., Zhangjiagang (CN)

(72) Inventors: James Geza Deak, Zhangjiagang (CN); Xiaofeng Cheng, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 0 days.

(21) Appl. No.: 15/315,336

(22) PCT Filed: May 14, 2015

(86) PCT No.: PCT/CN2015/078929
§ 371 (c)(1),
(2) Date: Nov. 30, 2016

(87) PCT Pub. No.: WO2015/180569
PCT Pub. Date: Dec. 3, 2015

(65) Prior Publication Data
US 2017/0200028 A1 Jul. 13, 2017

(30) Foreign Application Priority Data
May 30, 2014 (CN) .......................... 2014 1 0238859

(51) Int. Cl.
*G06K 7/08* (2006.01)
*G06K 19/06* (2006.01)

(52) U.S. Cl.
CPC ....... *G06K 7/087* (2013.01); *G06K 19/06187* (2013.01)

(58) Field of Classification Search
None
See application file for complete search history.

(56) References Cited

U.S. PATENT DOCUMENTS

2010/0111859 A1* 5/2010 Axelsson ........... A61K 49/1824
424/1.65
2011/0274624 A1* 11/2011 Decuzzi ............. A61K 49/1818
424/9.32

FOREIGN PATENT DOCUMENTS

CN         2715253        8/2005
CN       103456072       12/2013
(Continued)

OTHER PUBLICATIONS

CN 2715253 Y, Liao et al. (machine translation).*
(Continued)

*Primary Examiner* — Kristy A Haupt
(74) *Attorney, Agent, or Firm* — Schwegman Lundberg & Woessner, P.A.

(57) ABSTRACT

A magnetic anti-counterfeit label and identification system thereof, wherein the magnetic anti-counterfeit label comprises a substrate, a magnetic ink layer, an opaque layer and a protective coating. The magnetic ink layer covers the substrate. The opaque layer covers the magnetic ink layer in order to visually hide the characters, bar code, and other patterns which are printed using magnetic ink. Additionally the protective coating is composed of a polymer or a metal layer, which covers opaque layer. This identification system comprises a magnetic sensor for sensing the magnitude of the magnetic field emitted by the magnetic anti-counterfeit label, a permanent magnet or an electromagnet for magnetizing the magnetic anti-counterfeit label, a digital processing circuit that is electrically connected to the magnetic sensor, and a frame that is used to hold the magnetic sensor and the digital processing circuit. The digital processing circuit outputs a code corresponding to the magnetic anti-counterfeit label.

14 Claims, 4 Drawing Sheets

(56) References Cited

FOREIGN PATENT DOCUMENTS

| CN | 103544764 | 1/2014 |
|---|---|---|
| CN | 203433575 | 2/2014 |
| CN | 203490758 | 3/2014 |
| CN | 104021411 | 9/2014 |
| CN | 203894781 | 10/2014 |
| WO | WO-2015180569 | 12/2015 |

OTHER PUBLICATIONS

"International Application No. PCT/CN2015/078929, International Search Report and Written Opinion dated Jul. 15, 2015", (dated Jul. 15, 2015), 10 pgs.

* cited by examiner

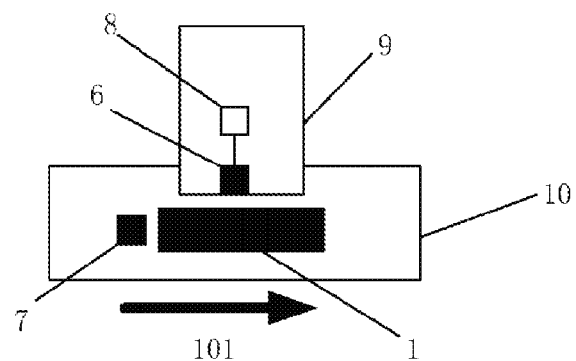
FIG. 2C
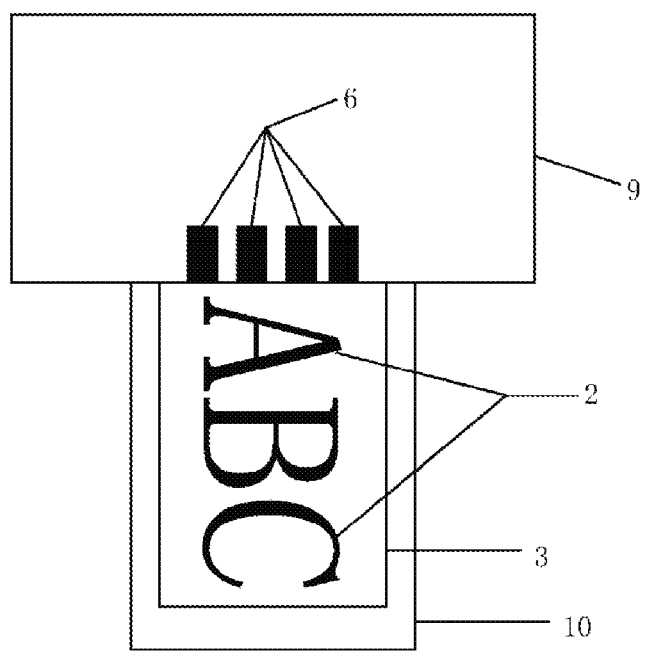
FIG. 3
OI389IOT
FIG. 4

MAGNETIC ANTI-COUNTERFEIT LABEL AND IDENTIFICATION SYSTEM THEREOF

PRIORITY CLAIM TO RELATED APPLICATIONS

This application is a U.S. national stage application filed under 35 U.S.C. §371 from International Application Serial No. PCT/CN2015/078929, which was filed 14 May 2015, and published as WO2015/180569 on 3 Dec. 2015, and which claims priority to Chinese Application No. 201410238859.6, filed 30 May 2014, which applications and publication are incorporated by reference as if reproduced herein and made a part hereof in their entirety, and the benefit of priority of each of which is claimed herein.

TECHNICAL FIELD

The present invention relates to an anti-counterfeit label, and in particular, to a magnetic anti-counterfeit label and an identification system thereof.

BACKGROUND ART

An anti-counterfeit label is an identifier that can be adhered to, printed on, or transferred to a surface, a package or an attachment (such as a hangtag, a name card, and an anti-counterfeit certificate card of a product) of a subject matter and has an anti-counterfeit function. The anti-counterfeit label can help consumers to quickly authenticate commodities in various industries, thus protecting rights of the consumers, and meanwhile help enterprise users to fight against counterfeit products, completely eradicate batch counterfeits, and protect brands of the enterprises, thus avoiding economic loss.

Currently, common anti-counterfeit methods on the market mainly include the following types: laser anti-counterfeit, watermark anti-counterfeit, paper ink anti-counterfeit, lead sealing anti-counterfeit, fluorescent anti-counterfeit, magnetic anti-counterfeit, temperature variation anti-counterfeit, and the like. The magnetic anti-counterfeit is mainly forming characters, a pattern, a bar code, or the like by using printing magnetic ink; then a magnetic signal can be detected by using a magnetic detector, and printed password information and the like are read by a decoder. Most anti-counterfeit labels in the prior art can be detected by a MICR detector, and are easily counterfeited. An identification system of these magnetic anti-counterfeit labels has a relatively complex structure and low accuracy.

SUMMARY OF THE INVENTION

In order to overcome the above defects in the prior art, the present invention provides a magnetic anti-counterfeit label that is easy to manufacture, low in cost, and convenient to use.

In order to achieve the above objective, the present invention provides the following technical solutions:

A magnetic anti-counterfeit label, the anti-counterfeit label including a substrate, a magnetic ink layer, an opaque layer and a protective coating, wherein, the magnetic ink layer covers the substrate, and has KV that enables a super-paramagnetic relaxation time thereof to last 5 to 6 hours in an ideal working temperature, the KV being a product of an anisotropic energy density and a particle volume; a character, bar code, or pattern structure printed using magnetic ink is formed on the magnetic ink layer; the character, bar code, or pattern structure has a magnetic property, an optical property, and a physical shape;

the opaque layer covers the magnetic ink layer, and is a print structure or a weak ferromagnet that can visually hide the character, bar code, or pattern structure;

the protective coating covers the opaque layer, and is composed of a polymer or metal that cannot be magnetized; and a total thickness of the opaque layer and the protective coating is less than or equal to an ideal resolution of a MICR character.

Preferably, the magnetic ink layer has a thickness of 0.001 to 10 mm, a width of 0.01 to 1000 mm, and a length of 0.01 to 1000 mm.

Preferably, the magnetic ink has a color, including red, yellow, green, gray, black or a color formed by any combination thereof.

Preferably, the magnetic ink includes hard magnetic powder and/or soft magnetic powder.

Preferably, when the magnetic ink is composed of the hard magnetic powder, a diameter size of the hard magnetic powder determines the super-paramagnetic relaxation time.

Preferably, a bonding layer is printed on the back of the substrate.

The present invention further provides an identification system capable of identifying the foregoing magnetic anti-counterfeit label, wherein the identification system includes:

at least one magnetic sensor, the magnetic sensor being used for sensing a magnitude of a magnetic field emitted by the magnetic anti-counterfeit label;

a magnet for magnetizing the magnetic anti-counterfeit label;

a digital processing circuit electrically connected to the magnetic sensor, the digital processing circuit outputting a code corresponding to the magnetic anti-counterfeit label; and a frame, which is made of a non-magnetic material that cannot be magnetized and is used for holding the magnetic sensor and the digital processing circuit.

Preferably, the magnetic sensor is an InSb, Hall, AMR, GMR or TMR sensor.

Preferably, a total width of the magnetic sensor is greater than a readable width required for design or a width of the magnetic anti-counterfeit label, or a total width of the magnetic sensor is equal to a readable width required for design or a width of the magnetic anti-counterfeit label.

Preferably, a perpendicular distance between the magnetic sensor and the magnetic anti-counterfeit label is 0.001 to 5 mm.

Preferably, a magnetizing field generated by the magnet is parallel or perpendicular to a surface of a sensed medium.

The magnetic sensor senses a gradient of component, which is parallel or perpendicular to a surface of a sensed medium, of the magnetic field emitted by the magnetic anti-counterfeit label.

Preferably, the magnet is located on the frame, at either end of the magnetic anti-counterfeit label, or on the back of the magnetic anti-counterfeit label, such that the magnetic anti-counterfeit label magnetized before being read.

Preferably, the magnet is a permanent magnet or an electromagnet.

Compared with the prior art, the present invention has the following beneficial effects:

1) The anti-counterfeit label provided by the present invention is easy to manufacture and low in cost, can be directly printed on paper or carriers of other materials, and can be conveniently used on files, paper money, credit cards, packages, and the like.

2) The anti-counterfeit label provided by the present invention can be printed as structures such as characters, barcodes, or patterns as required.

3) The surface of the anti-counterfeit label provided by the present invention is covered and printed using ordinary non-magnetic ink; the anti-counterfeit label cannot be directly detected by using an optical instrument in appearance, and does not show magnetism externally in a normal environment, thus significantly reducing the possibility of being detected and counterfeited.

4) According to the anti-counterfeit label provided by the present invention, the size of the characters can be selected in a very large range according to a use requirement, which is very convenient to use.

5) The identification system provided by the present invention has a simple and portable structure, and achieves high identification accuracy.

BRIEF DESCRIPTION OF THE DRAWINGS

In order to describe the technical solutions in technologies of embodiments of the present invention more clearly, the accompanying drawings to be used in the descriptions about the technologies of the embodiments are briefly introduced in the following. Apparently, the accompanying drawings in the following descriptions are merely some embodiments of the present invention, and those of ordinary skill in the art can also derive other accompanying drawings from these accompanying drawings without making creative efforts.

FIGS. 2A-2C are schematic structural diagrams of an identification system according to the present invention;

FIG. 3 is a schematic diagram of a situation where multiple magnetic sensors are needed;

FIG. 4 is a schematic diagram of characters printed using magnetic ink;

DETAILED DESCRIPTION

The present invention is described below in detail with reference to the accompanying drawings and in combination with embodiments.

Embodiment 1

Figure 1:
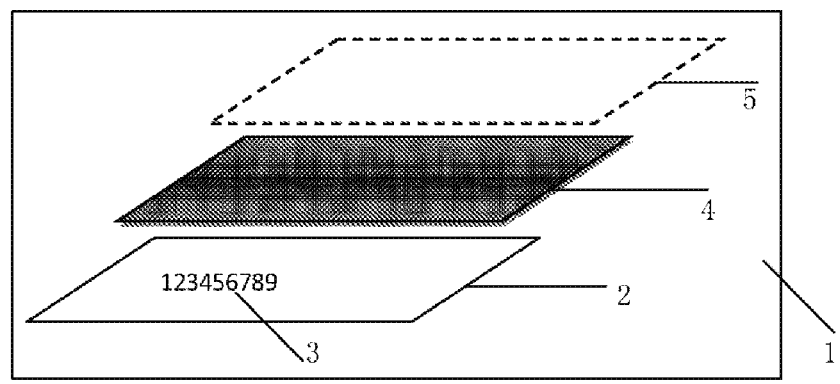
FIG. 1 is a schematic structural diagram of a magnetic anti-counterfeit label according to the present invention.

FIG. 1 is a schematic structural diagram of a magnetic anti-counterfeit label according to the present invention. The magnetic anti-counterfeit label 1 includes a substrate 2, a magnetic ink layer that covers the substrate 2, an opaque layer 4 and a protective coating 5. In this embodiment, the magnetic ink layer is actually a character 3 printed using magnetic ink. The magnetic ink includes hard magnetic powder and/or soft magnetic powder. When the magnetic ink is composed of the hard magnetic powder, a diameter size of the hard magnetic powder determines a super-paramagnetic relaxation time TN. The character 3 printed using the magnetic ink has a thickness of 0.001 to 10 mm, a width of 0.01 to 1000 mm, and a length of 0.01 to 1000 mm, and the color thereof may be red, yellow, green, gray, black, or a color formed by any combination thereof. The color of the character 3 is the same as that of the magnetic ink. Besides, the magnetic ink may also form structures such as a barcode or a pattern having a magnetic property, an optical property, and a physical shape, to substitute the character 3 herein. KV of the magnetic ink forming the character 3 enables the super-paramagnetic relaxation time TN thereof to last 5 to 6 hours at an ideal constant working temperature, wherein K is a particle magnetic anisotropic energy density, and V is a particle volume. The relaxation time TN of the magnetic ink may be selected according to an actual requirement, which is not limited to the above 5 to 6 hours, and may be a longer time, for example, 1 to 2 days. The opaque layer 4 may be a print structure or a weak ferromagnet, and may also be composed of non-magnetic ink. When the character 3 is magnetized, the opaque layer 4 does not present magnetism. The opaque layer 4 covers the character 3, such that the magnetic property, the optical property, and the physical shape of the character 3 are not presented to the external. The protective coating 5 covers the opaque layer 4, and is composed of a polymer or metal that cannot be magnetized, which mainly plays a role of protecting the character 3 and the opaque layer 4 and further enhancing the effect of shielding the character 3. A total thickness of the opaque layer 4 and the protective coating 5 is less than or equal to an ideal resolution of a MICR character. The magnetic anti-counterfeit label 1 may be directly adhered to an identified object; or a bonding layer may be printed on the back of the substrate 2 (that is, a lower surface not covered by the magnetic ink layer), and then the magnetic anti-counterfeit label 1 is adhered to the identified object via the bonding layer. The identified object where the magnetic anti-counterfeit label 1 is located is a medium sensed by an identification system during identification of the magnetic anti-counterfeit label.

Embodiment 2

Figure 2A:
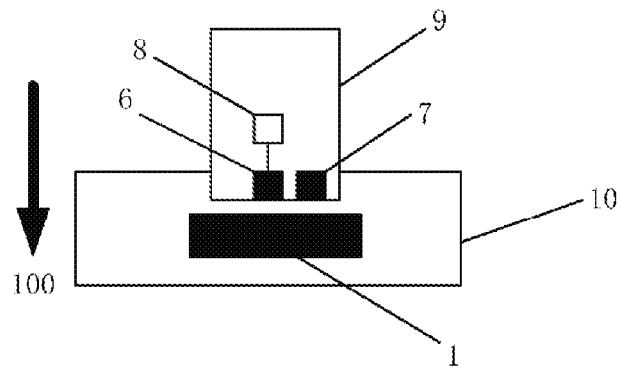
Figure 2B:
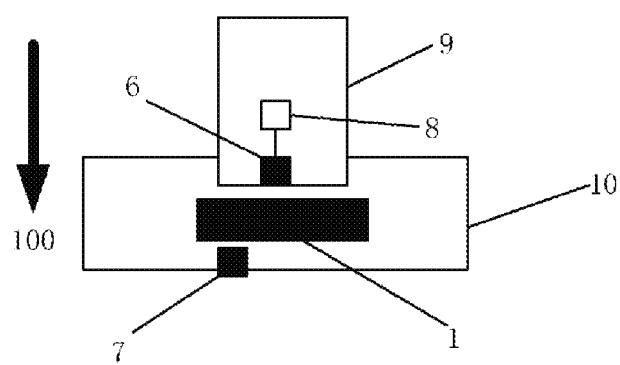

FIGS. 2A-2C are three schematic structural diagrams of an identification system capable of identifying the magnetic anti-counterfeit label 1. The identification system includes a permanent magnet 7, a frame 9, at least one magnetic sensor 6 and a digital processing circuit 8 electrically connected to the magnetic sensor 6. Both the magnetic sensor 6 and the digital processing circuit 8 are held in the frame 9, and the frame 9 is made of a non-magnetic material that cannot be magnetized. A difference among the three figures FIGS. 2A-2C lies in the position of the permanent magnet 7: the permanent magnet 7 is located in the frame 9 in FIG. 2A, the permanent magnet 7 is located on the back of the magnetic anti-counterfeit label 1 in FIG. 2B, and the permanent magnet 7 is located at one side of the magnetic anti-counterfeit label 1 in FIG. 2C. In FIGS. 2A and 2B, a magnetizing field generated by the permanent magnet 7 is perpendicular to the sensed medium, that is, the surface of the magnetic anti-counterfeit label 1, so that a magnetization direction 100 of the magnetic anti-counterfeit label 1 is perpendicular to the surface of the identified object 10 where the magnetic anti-counterfeit label 1 is located. In FIG. 2C, the magnetizing field generated by the permanent magnet 7 is parallel to the sensed medium, that is, the surface of the magnetic anti-counterfeit label 1, so that a magnetization direction 101 of the magnetic anti-counterfeit label 1 is parallel to the surface of the identified object 10 where the magnetic anti-counterfeit label 1 is located. The magnetic sensor 6 may be an InSb, Hall, AMR, GMR or TMR sensor, and is a TMR sensor in this embodiment. As required by an actual application, a total width thereof may be greater than or equal to the width of the magnetic anti-counterfeit label 1 or may be greater than or equal to a readable width required for design. A perpendicular distance between the magnetic sensor 6 and the magnetic anti-counterfeit label 1 is 0.001 to 5 mm. FIG. 3 shows a situation where multiple magnetic sensors 6 are needed.

The magnetic anti-counterfeit label 1 generates a magnetic field after being magnetized by the permanent magnet 7, and then the magnetic sensor 6 senses a gradient of a magnetic field component, in an X-axis direction or a Z-axis direction, of the magnetic field emitted by the magnetic anti-counterfeit label 1, wherein the X-axis direction is a direction parallel to the sensed surface of the magnetic anti-counterfeit label 1, and the Z-axis direction is a direction perpendicular to the sensed surface of the magnetic anti-counterfeit label 1. In FIGS. 2A and 2B, the magnetic sensor 6 senses the gradient of the magnetic field component in the X-axis direction, and in FIG. 2C, the magnetic sensor 6 senses the gradient of the magnetic field component in the Z-axis direction. Then, the magnetic sensor 6 transmits a sensed signal to the digital processing circuit 8, and the digital processing circuit 8 outputs a code corresponding to the magnetic anti-counterfeit label 1 according to the received signal.

Figure 5:
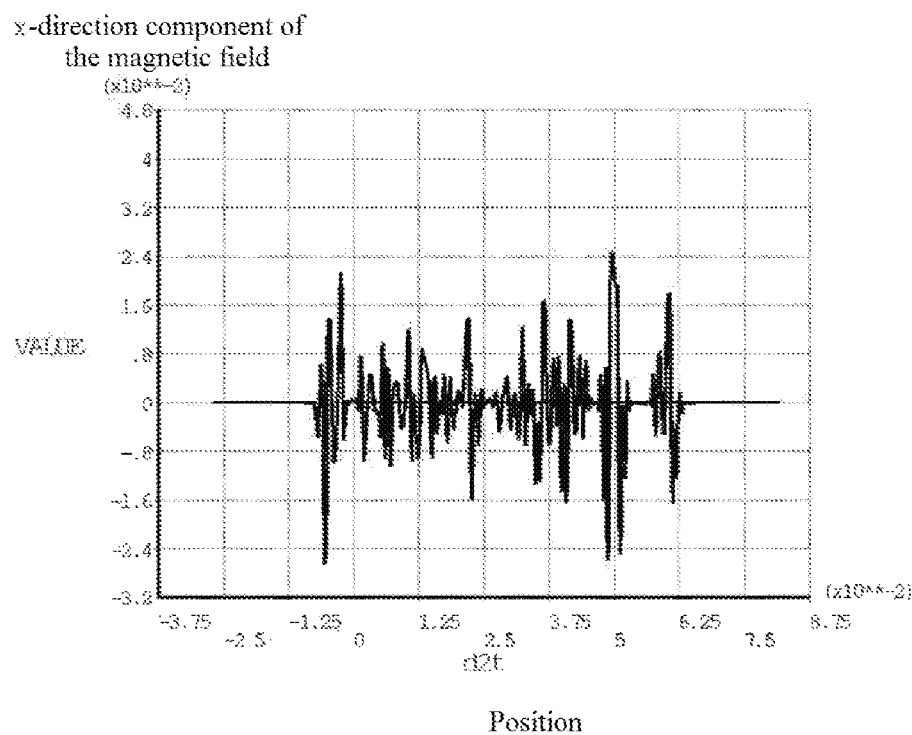
FIG. 5 is a relation curve between an output signal of a magnetic sensor and a character position when the thickness of the characters in FIG. 4 is 0.2 mm and a magnetization direction is perpendicular to the paper direction.
Figure 6:
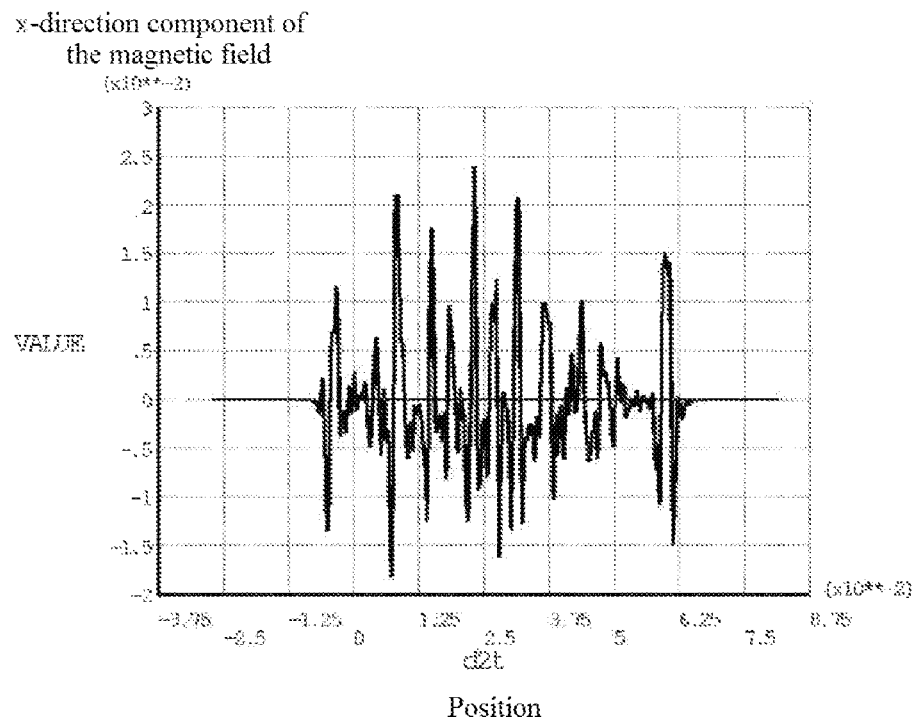
FIG. 6 is a relation curve between an output signal of a magnetic sensor and a character position when the thickness of the characters in FIG. 4 is 0.5 mm and a magnetization direction is perpendicular to the paper direction.
Figure 7:
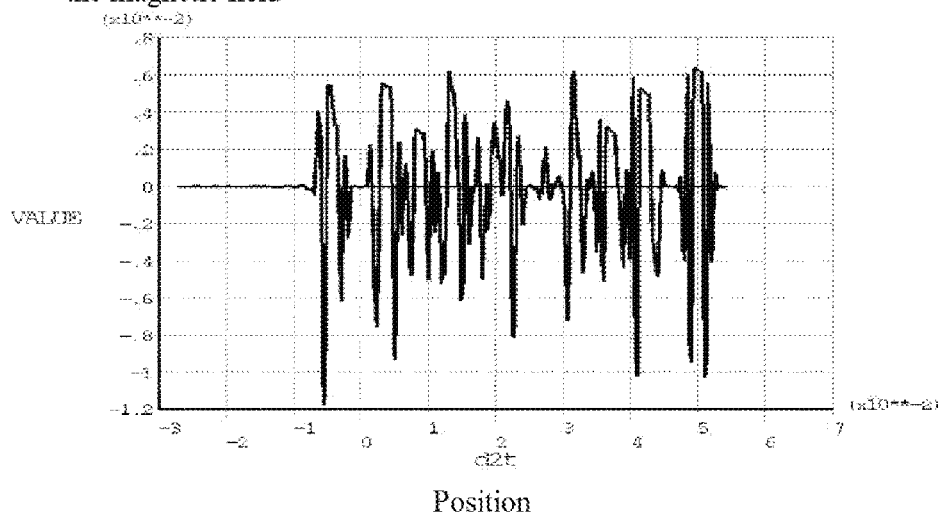
FIG. 7 is a relation curve between an output signal of a magnetic sensor and a character position when the thickness of the characters in FIG. 4 is 0.2 mm and a magnetization direction is parallel to the paper direction.
Figure 8:
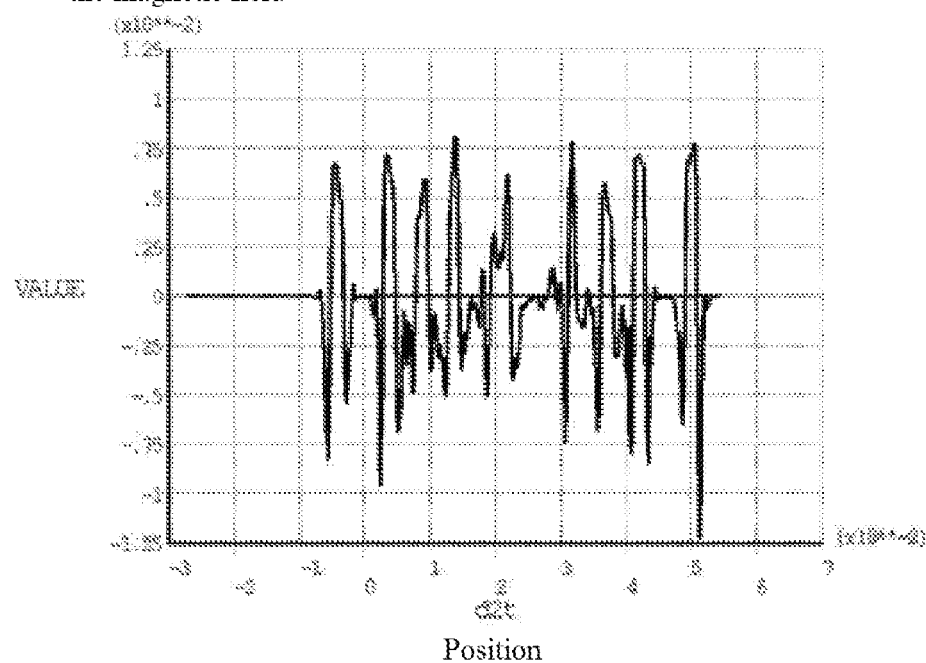
FIG. 8 is a relation curve between an output signal of a magnetic sensor and a character position when the thickness of the characters in FIG. 4 is 0.5 mm and a magnetization direction is parallel to the paper direction.

By using magnetic characters shown in FIG. 4 as an example, the magnitude of the magnetic field emitted by the characters is sensed along a horizontal central line by using a magnetic sensor. FIG. 5 and FIG. 6 are relation curves between an X-axis direction component sensed by the magnetic sensor and a character position when the character magnetization direction is perpendicular to the paper direction and the character thickness is 0.2 mm and 0.5 mm, respectively. FIG. 7 and FIG. 8 are relation curves between a Z-axis direction component sensed by the magnetic sensor and a character position when the character magnetization direction is parallel to the paper direction and the character thickness is 0.2 mm and 0.5 mm, respectively. It can be found by comparing the four figures that, for characters of the same thickness, the wave crest is more obvious and the crest value is greater when the character magnetization direction is perpendicular to the paper direction than those when the character magnetization direction is parallel to the paper direction; for characters in the same magnetization direction, the thicker a characters is, the more obvious the wave crest is and the greater the crest value is, that is, a stronger signal output by the magnetic sensor means a better identification effect. The position corresponding to the character can be determined according to the crest value in the figure, and by sensing the magnetic character with multiple magnetic sensors 6, the character can be identified.

In this embodiment, the magnetic anti-counterfeit label 1 is magnetized by using a permanent magnet, and the permanent magnet may also be replaced with a magnetic object that can be used for magnetizing the magnetic anti-counterfeit label 1, such as an electromagnet; the principles thereof are the same, and details are not described herein again.

The above descriptions are merely preferred embodiments of the present invention, and are not intended to limit the present invention. For those skilled in the art, the present invention may have various modifications and changes. Any modification, equivalent replacement, improvement or the like made without departing from the spirit and principle of the present invention shall all fall within the protection scope of the present invention.

The invention claimed is:

1. A magnetic anti-counterfeit label, the anti-counterfeit label comprising:
   a substrate,
   a magnetic ink layer,
   an opaque layer and
   a protective coating,
   wherein the magnetic ink layer covers the substrate and has KV that enables a super-paramagnetic relaxation time thereof to last 5 to 6 hours in an ideal working temperature, the KV being a product of an anisotropic energy density and a particle volume; wherein a character, bar code, or pattern structure printed using magnetic ink is formed on the magnetic ink layer; and wherein the character, bar code, or pattern structure has a magnetic property, an optical property, and a physical shape;
   wherein the opaque layer covers the magnetic ink layer and is a print structure or a weak ferromagnet that can visually hide the character, bar code, or pattern structure;
   wherein the protective coating covers the opaque layer and is composed of a polymer or metal that cannot be magnetized; and
   wherein a total thickness of the opaque layer and the protective coating is less than or equal to an ideal resolution of a MICR character.

2. The magnetic anti-counterfeit label according to claim 1, wherein the magnetic ink layer has a thickness of 0.001 to 10 mm, a width of 0.01 to 1000 mm, and a length of 0.01 to 1000 mm.

3. The magnetic anti-counterfeit label according to claim 1, wherein the magnetic ink has a color comprising red, yellow, green, gray, black or a color formed by any combination thereof.

4. The magnetic anti-counterfeit label according to claim 1, wherein the magnetic ink comprises hard magnetic powder and/or soft magnetic powder.

5. The magnetic anti-counterfeit label according to claim 4, wherein, when the magnetic ink is composed of the hard magnetic powder, a diameter size of the hard magnetic powder determines the super-paramagnetic relaxation time.

6. The magnetic anti-counterfeit label according to claim 1, wherein a bonding layer is printed on the back of the substrate.

7. An identification system capable of identifying the magnetic anti-counterfeit label according to claim 1, wherein the identification system comprises:
   at least one magnetic sensor, the magnetic sensor being used for sensing a magnitude of a magnetic field emitted by the magnetic anti-counterfeit label;
   a magnet for magnetizing the magnetic anti-counterfeit label;
   a digital processing circuit electrically connected to the magnetic sensor, the digital processing circuit outputting a code corresponding to the magnetic anti-counterfeit label; and a frame, which is made of a non-magnetic material that cannot be magnetized and is used for holding the magnetic sensor and the digital processing circuit.

8. The identification system according to claim 7, wherein the magnetic sensor is an InSb, Hall, AMR, GMR or TMR sensor.

9. The identification system according to claim 7, wherein a total width of the magnetic sensor is greater than a readable width required for design or a width of the magnetic anti-counterfeit label, or a total width of the magnetic sensor is equal to a readable width required for design or a width of the magnetic anti-counterfeit label.

10. The identification system according to claim 7, wherein a perpendicular distance between the magnetic sensor and the magnetic anti-counterfeit label is 0.001 to 5 mm.

11. The identification system according to claim 7, wherein a magnetizing field generated by the magnet is parallel or perpendicular to a surface of a sensed medium.

12. The identification system according to claim 7, wherein the magnetic sensor senses a gradient of component which is parallel or perpendicular to a surface of a sensed medium of the magnetic field emitted by the magnetic anti-counterfeit label.

13. The identification system according to claim 7, wherein the magnet is located on the frame at either end of the magnetic anti-counterfeit label or on the back of the magnetic anti-counterfeit label, such that the magnetic anti-counterfeit label is magnetized before being read.

14. The identification system according to claim 7, wherein the magnet is a permanent magnet or an electromagnet.

* * * * *